2,878,286

PROCESS FOR PREPARING SYMMETRICAL HEXACHLORODIPHENYL UREA

Ralph S. Temple, Niagara Falls, N. Y., assignor to E. I. du Pont de Nemours & Company, Wilmington, Del., a corporation of Delaware No Drawing. Application June 9, 1945
Serial No. 598,663

3 Claims. (Cl. 260—553)

This invention relates to a new and improved process for the preparation of symmetrical hexachlorodiphenyl urea. More particularly, it relates to a process wherein the symmetrical hexachlorodiphenyl urea is obtained by reacting 2,4,6-trichloroaniline and urea in glacial acetic acid containing water whereby improved yields are obtained.

Symmetrical hexachlorodiphenyl urea was previously prepared by a batch process wherein 2 mols of 2,4,6-trichloroaniline were reacted with 1 mol of urea in an anhydrous reaction medium, such as glacial acetic acid. To increase the yield, sulfuric acid was added to the reaction mixture and, in order to maintain the reaction medium anhydrous, the acetic acid reaction medium for fortified with acetic anhydride. According to this procedure, the reaction mixture was refluxed at atmospheric pressure for approximately 2 hours, during which period sulfuric acid was slowly added, the amount of sulfuric acid being determined by spot tests using methyl violet indicator paper. At the end of the reflux period, the reaction mixture was filtered and the separated symmetrical hexachlorodiphenyl urea was washed with water to remove the ammonium salts carried thereby. The filtrate was utilized as the reaction medium for subsequent runs. The wash acid was concentrated and used in subsequent batches.

As previously described, the reaction of 2,4,6-trichloroaniline with urea was carried out in an anhydrous reaction medium. The use of an anhydrous reaction medium was deemed essential by the prior art for obtaining maximum yields. It was believed that the presence of water in the reaction medium resulted in the formation of undesirable by-products, such as, for example, acetamide, and lowered the yield. As a matter of fact, when the reaction was carried out in the presence of an appreciable quantity of water, a decreased yield was obtained.

An object of this invention is to provide a new and improved process for the preparation of symmetrical hexachlorodiphenyl urea by reacting 2,4,6-trichloroaniline and urea.

Another object of this invention is to provide a process for the preparation of symmetrical hexachlorodiphenyl urea by reacting 2,4,6-trichloroaniline and urea in a reaction medium containing water, whereby increased yields are obtained.

Other and additional objects will become apparent hereinafter.

The invention is based on the discovery that when 2,4,6-trichloroaniline is reacted with urea in acetic acid containing 1% to 3% of water, the formation of undesirable by-products, such as acetamide, is minimized and the yield of symmetrical hexachlorodiphenyl urea is increased. Thus, the objects of the invention are accomplished, in general, by reacting 2,4,6-trichloroaniline and urea in acetic acid containing 1% to 3% of water.

The details and manner of practicing the invention will become apparent from the following specific example, the proportions being by weight unless otherwise specified:

Example

The following charge was introduced into a 2-liter flask equipped with a reflux condenser, a stirrer and a feed line for adding sulfuric acid:

Reaction medium:
    600 cc. of filtrate from previous runs
    200 cc. of wash acetic acid used for washing the product of previous runs
2,4,6-trichloroaniline, 90 grs.
Urea, 92 grs.

The flask was heated on an oil bath and the contents of the flask was agitated and refluxed, the temperature being maintained between 125° C. and 130° C. During the reflux, 150 grs. of 66° Bé. sulfuric acid (93.19% sulfuric acid) were added over a 2-hour period. At the end of the reaction, the reaction mixture was filtered and the symmetrical hexachlorodiphenyl urea, which was filtered off, was water washed to remove ammonium salts carried thereby. The filtrate and the wash acid were utilized in the production of a reaction mixture for subsequent runs. The yield of symmetrical hexachlorodiphenyl urea based on the 2,4,6-trichloroaniline charge was 84.5% of theory.

In the example, the initial reaction medium contained 1% to 3% of water which was introduced by way of the wash acid, and, during the reaction, additional water was introduced together with the sulfuric acid. The additional water introduced constituted approximately 1.25% based on the reaction medium and was added to replenish the water used up in the side reaction.

Theoretically, 2 mols of 2,4,6-trichloroaniline combines with 1 mol of urea to form symmetrical hexachlorodiphenyl urea. In the instant invention, however, it is preferred to use an excess of urea and, in general, the urea is used in an amount of from 200% to 800% of the theoretical amount required for the conversion of the 2,4,6-trinchloroaniline.

In the example, the 2,4,6-trichloroaniline is present in an amount which is equivalent to 11.25% by weight based on the reaction medium. It is to be understood, however, that the invention is not restricted to such concentration. In general, the concentration of the 2,4,6-trichloroaniline in the reaction medium is at least 5%, since at lower concentrations no symmetrical hexachlorodiphenyl urea is produced. The maximum concentration is that at which the reaction mixture can be conveniently handled.

Instead of using 2,4,6-trichloroaniline, the hydrochloride thereof can be used. When the hydrochloride is used, such quantity thereof is used as to yield the amounts of 2,4,6-trichloroaniline hereinbefore described.

The temperature at which the reaction is carried out, preferably 125° C. to 130° C., is limited to the boiling point of the reaction mixture, which obviously varies with the concentration of the reactants in the reaction medium as well as the pressure on the reactor. Though as shown by the example the reaction is carried out at atmospheric pressure, the pressure at which the reaction is carried out is not critical, and the reaction therefore can also be carried out at pressures other than atmospheric, such, for example, as superatmospheric. The ratio of the reactants will vary with different pressures, but this can be determined by simple empirical experiment.

The time necessary for the completion of the reaction varies with the ratio of the reactants. In general, the time may be from 1½ to 4 hours, though with the higher ratio of urea the time can be extended.

Though in the specific example the quantity of water in the initial reaction mixture is 1% to 3% and the additional water added is 1.25% by weight of the reaction medium, the invention is not restricted thereto. In general, when the water content of the solvent medium during the reaction is as low as 1% and as high as 3%, improved yields of symmetrical hexachlorodiphenyl urea will be obtained.

During the reaction, water is used up in side reactions. To maintain the water content within the limits hereinbefore described, additional water is added during the reaction. A convenient manner of introducing the additional water is by way of the sulfuric acid whereby it is added gradually throughout the course of the reaction. Alternatively, the water can be introduced into the reaction medium at any time prior to refluxing of the reaction mixture. When the entire desired quantity of water is introduced into the reaction medium, anhydrous sulfuric acid may be used. Preferably, a portion of the desired amount of water is introduced into the reaction medium prior to refluxing and the remainder of the water gradually introduced by the sulfuric acid. When wash acid (i. e., acetic acid solution obtained when the product filtered out of the reaction mixture was water washed) containing an excess amount of water is utilized in making up the reaction medium, sufficient glacial acetic acid or acetic anhydride is added thereto to bring the water content to the desired concentration.

This invention provides a process whereby increased yields of symmetrical hexachlorodiphenyl urea are obtained. The use of a reaction medium containing water as contemplated by this invention is directly contra to the teaching of the prior art, and the obtaining of increased yields thereby is indeed most surprising and unexpected.

Since it is obvious that many changes and modifications can be made in the above-described details without departing from the nature and spirit of the invention, it is to be understood that the invention is not to be limited thereto except as set forth in the appended claims.

I claim:

1. In the method of preparing symmetrical hexachlorodiphenyl urea by reacting a substance selected from the group which consists of 2,4,6-trichloroaniline and the hydrochloride thereof with urea in a reaction medium and wherein sulfuric acid is fed to the reaction mixture during the course of the reaction, the improvement which comprises carrying out the reaction in an acetic acid medium containing 1% to 3% by weight of water.

2. In the method of preparing symmetrical hexachlorodiphenyl urea by reacting a substance selected from the group which consists of 2,4,6-trichloroaniline and the hydrochloride thereof with urea in a reaction medium and wherein sulfuric acid is fed to the reaction mixture during the course of the reaction, the improvement which comprises carrying out the reaction in an acetic acid medium containing 1% to 3% by weight of water and introducing at least a portion of said water during the course of the reaction by feeding sulfuric acid of appropriate concentration.

3. In the method of preparing symmetrical hexachlorodiphenyl urea by reacting a substance selected from the group which consists of 2,4,6-trichloroaniline and the hydrochloride thereof with urea in a reaction medium and wherein sulfuric acid is fed to the reaction mixture during the course of the reaction, the improvement which comprises carrying out the reaction in an acetic acid medium containing water and introducing additional water into said reaction medium during the course of the reaction by feeding sulfuric acid of appropriate concentration, the total quantity of water being from 1% to 3% by weight of the reaction medium.

No references cited.